(12) United States Patent
Yagi et al.

(10) Patent No.: US 7,399,551 B2
(45) Date of Patent: Jul. 15, 2008

(54) BATTERY COOLING STRUCTURE

(75) Inventors: Kazuhiko Yagi, Wako (JP); Eiji Koike, Wako (JP); Harumi Takedomi, Wako (JP); Takeo Nishibori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 58 days.

(21) Appl. No.: 11/014,204

(22) Filed: Dec. 17, 2004

(65) Prior Publication Data

US 2005/0153199 A1    Jul. 14, 2005

(30) Foreign Application Priority Data

Dec. 24, 2003   (JP)   ............................. 2003-426515

(51) Int. Cl.
   *H01M 2/10*   (2006.01)
(52) U.S. Cl. .................. 429/148; 429/163; 429/82; 429/83; 429/87; 429/88; 429/99
(58) Field of Classification Search .............. 429/99, 429/120
   See application file for complete search history.

(56) References Cited

U.S. PATENT DOCUMENTS 5,006,427 A * 4/1991 Bohm et al. ............... 429/101
5,585,204 A * 12/1996 Oshida et al. ............... 429/62
6,335,116 B1 * 1/2002 Yamane et al. ............. 429/176
6,569,556 B2 * 5/2003 Zhou et al. ................. 429/88

FOREIGN PATENT DOCUMENTS

| JP | 08-096858 | 4/1996 |
|----|-----------|--------|
| JP | 10-252466 | 9/1998 |
| JP | 10-255859 | 9/1998 |
| JP | 11-329518 | 11/1999 |
| JP | 2000-133225 | 5/2000 |

OTHER PUBLICATIONS

Japanese Office Action dated May 7, 2008, Application No. 2003-426515.

* cited by examiner

*Primary Examiner*—Susy Tsang-Foster
*Assistant Examiner*—Cynthia Lee
(74) *Attorney, Agent, or Firm*—Westerman, Hattori, Daniels & Adrian, LLP.

(57) ABSTRACT

In a battery cooling structure, a battery case housing a large number of battery modules is formed into the shape of a rectangular tube having a cooling air inlet and a cooling air outlet, and V-shaped cooling air guide channels having a decreasing flow-path cross sectional area are provided on inner faces of air guide plates that define upper and lower faces of the rectangular tube. The flow of cooling air is deflected by these V-shaped cooling air guide channels toward a central part on the downstream side, thus effectively cooling the battery modules disposed in the central part, for which the cooling effect is poor to make uniform the temperature of the battery modules, resulting in a suppressed variation in capacity and lifetime. Moreover, since it is not necessary to provide a bypass passage in the battery case, it is possible to simplify the structure of the battery case, reduce the dimensions, and improve the degree of freedom in the layout.

20 Claims, 16 Drawing Sheets

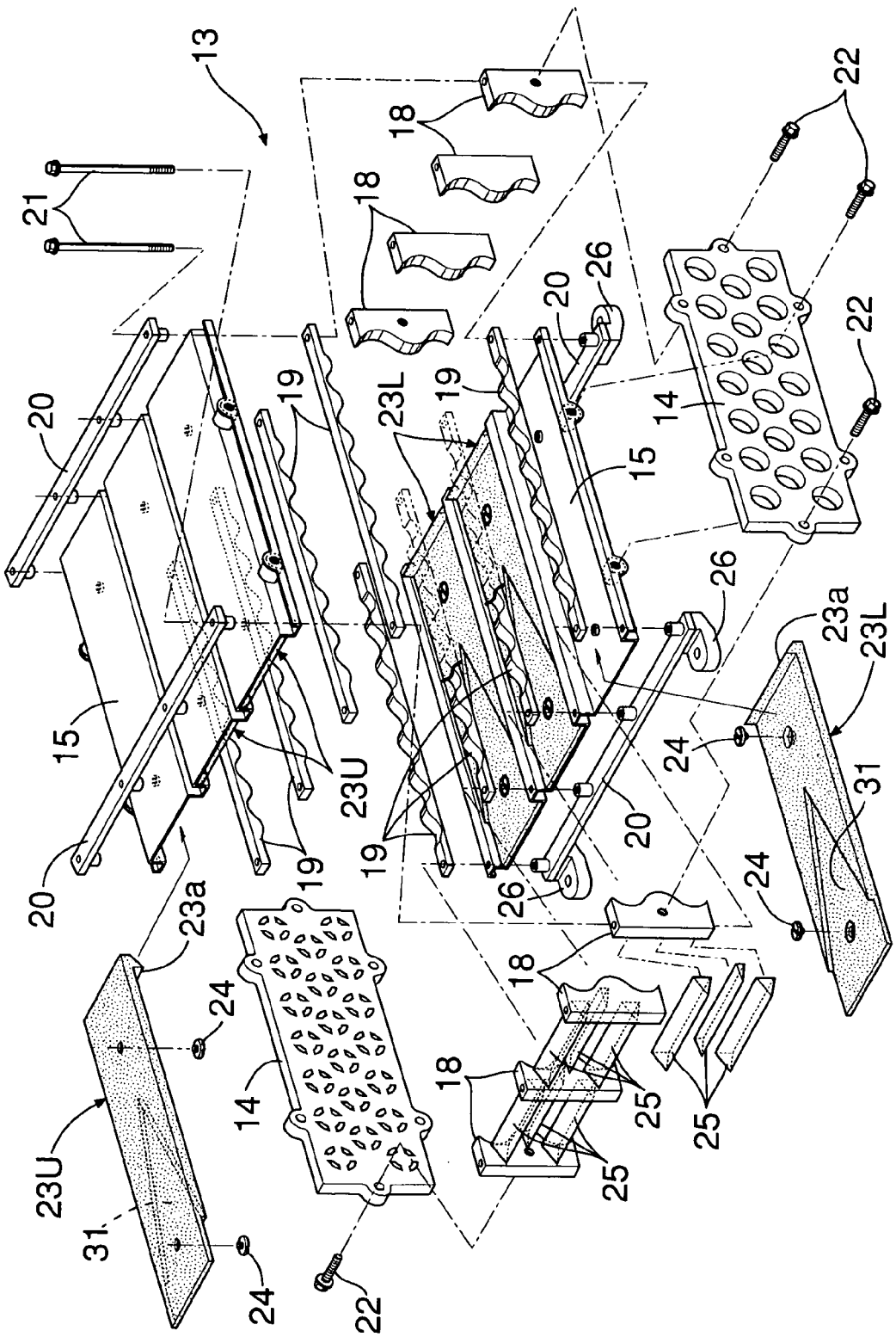

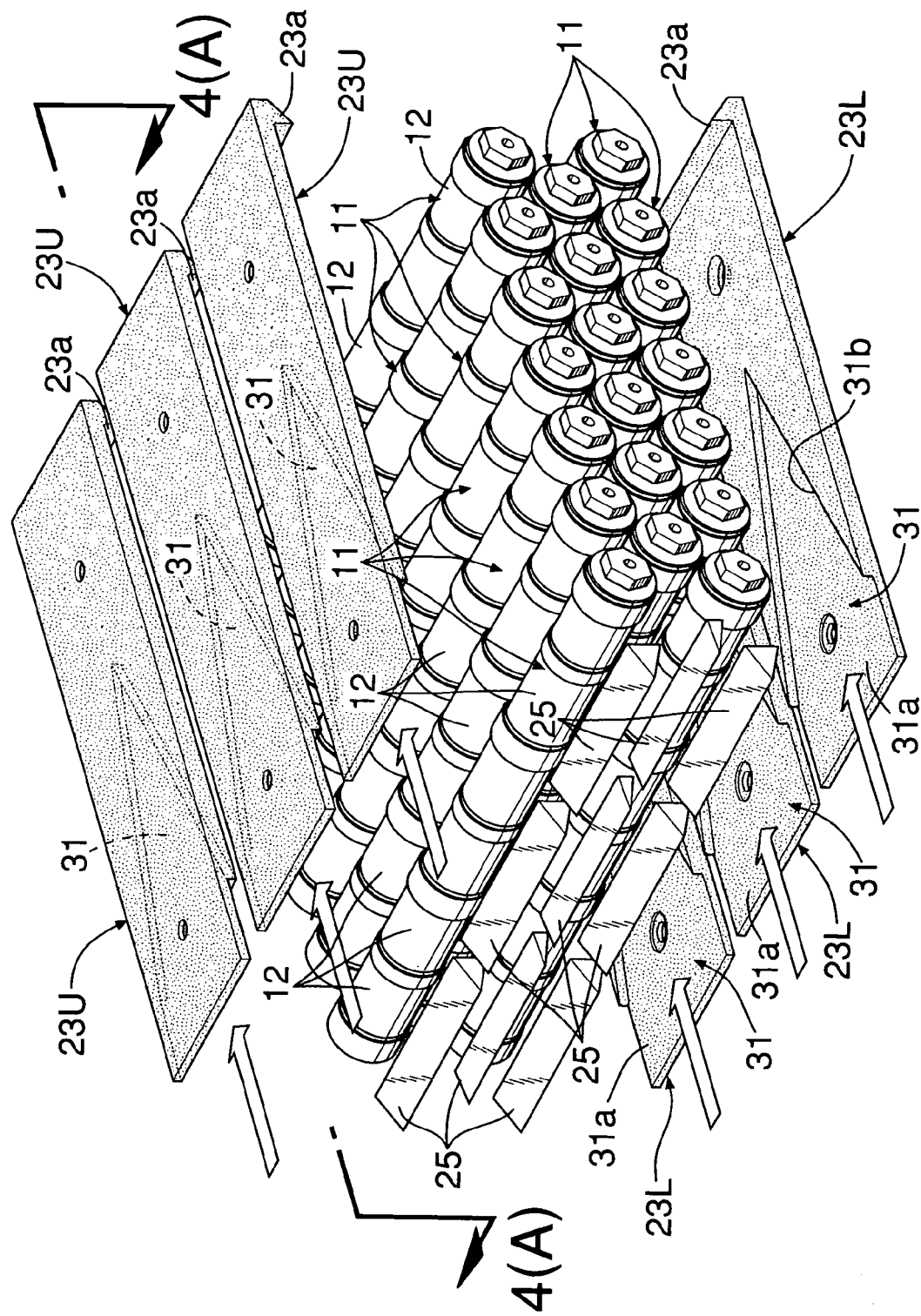

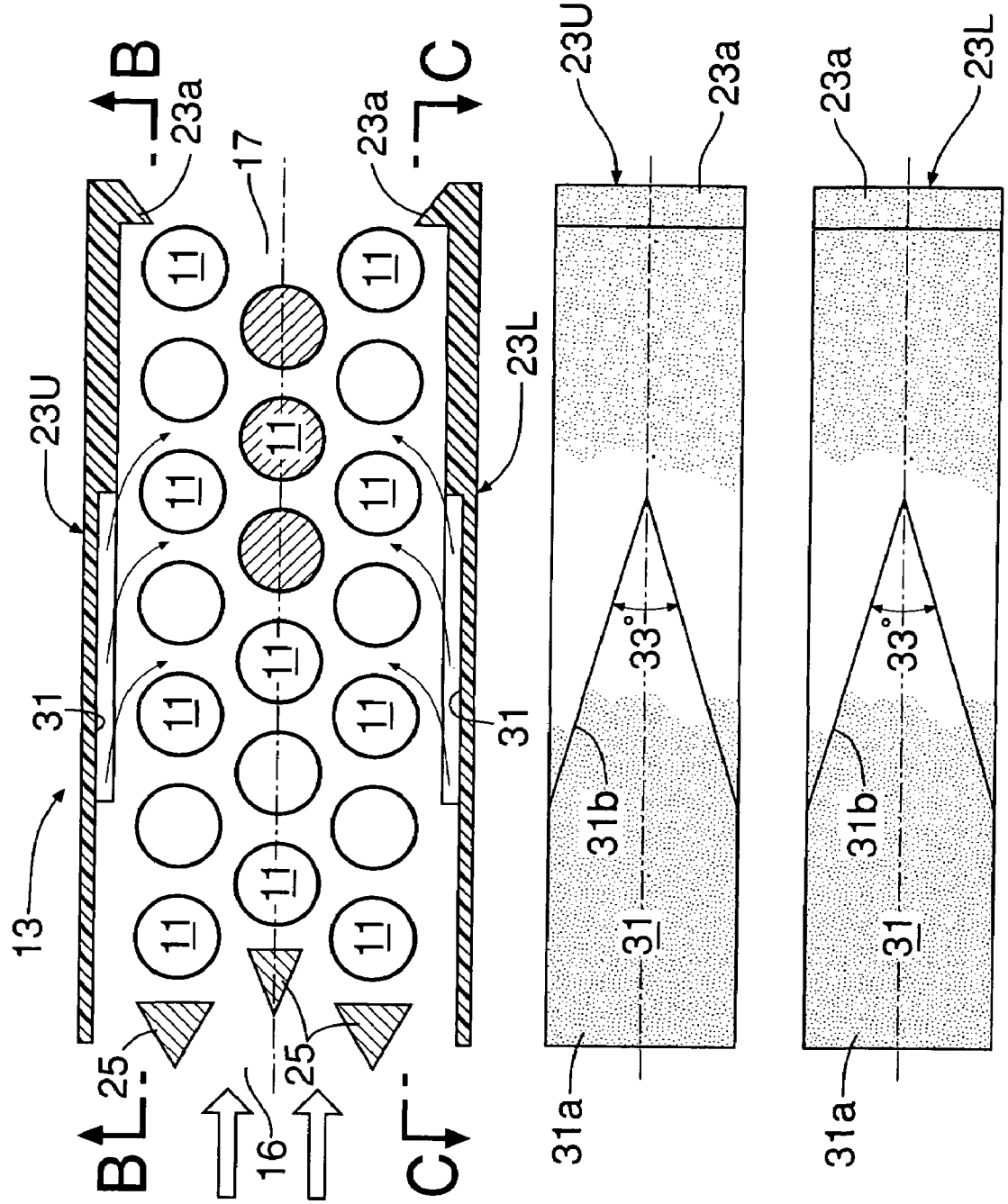

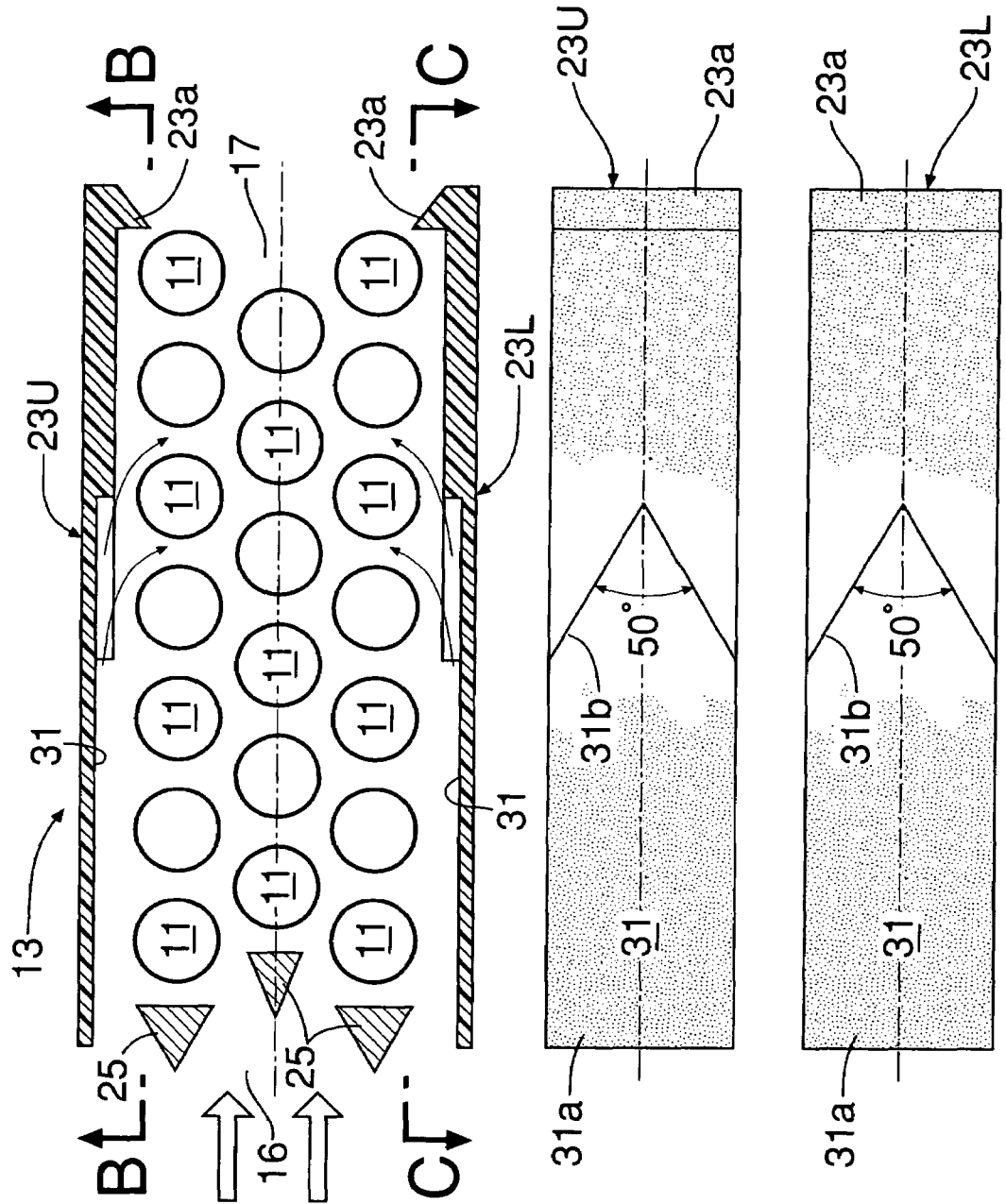

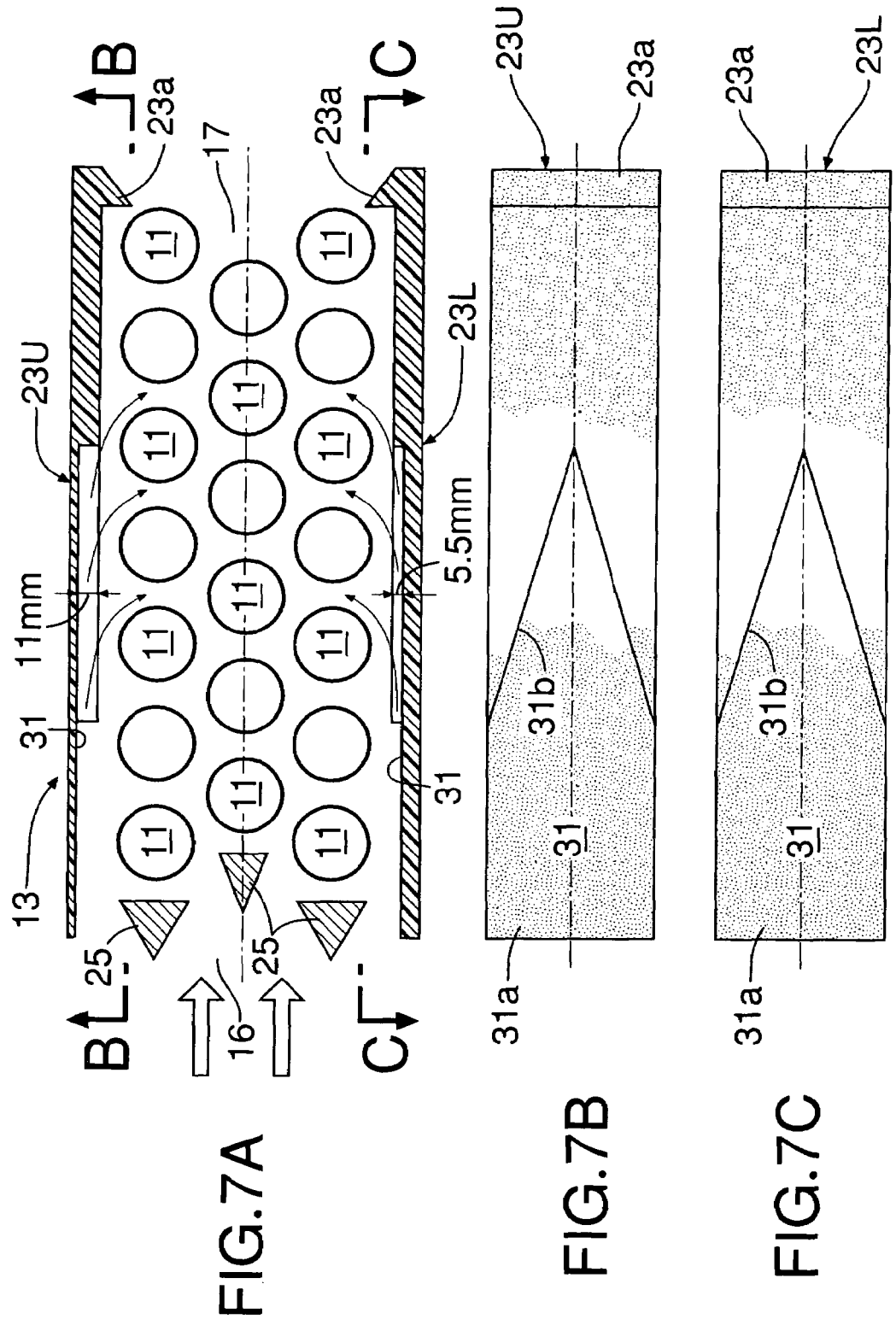

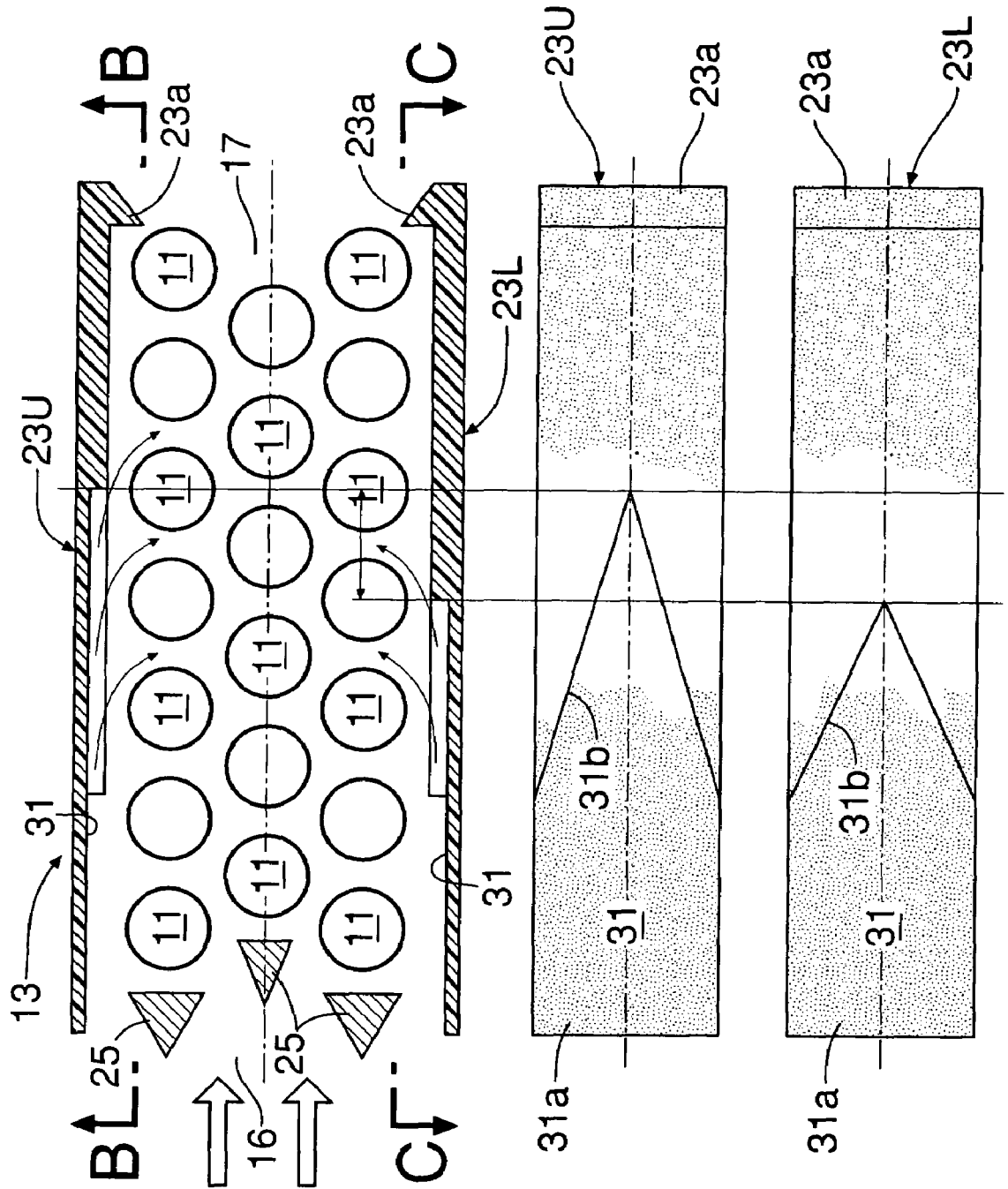

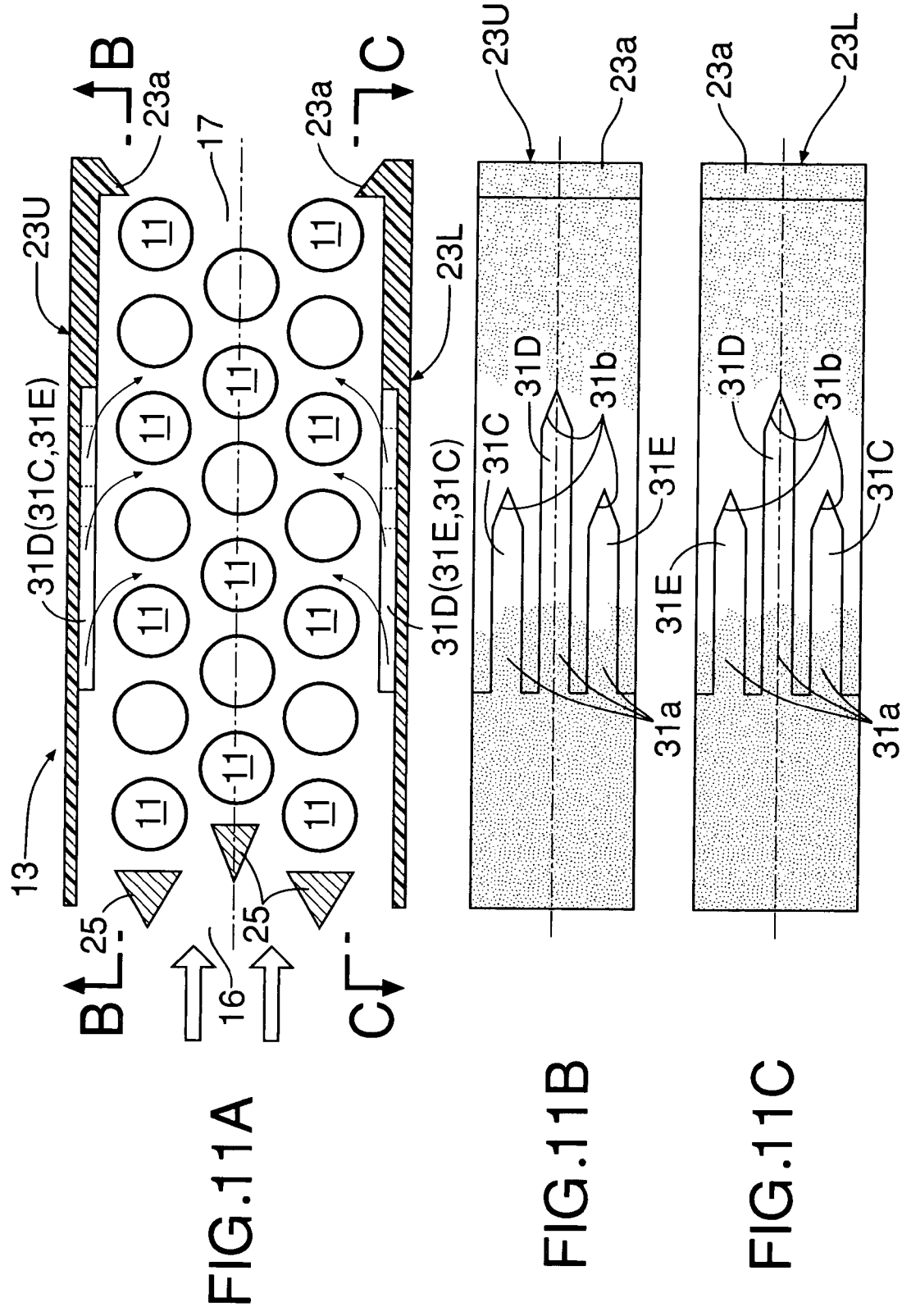

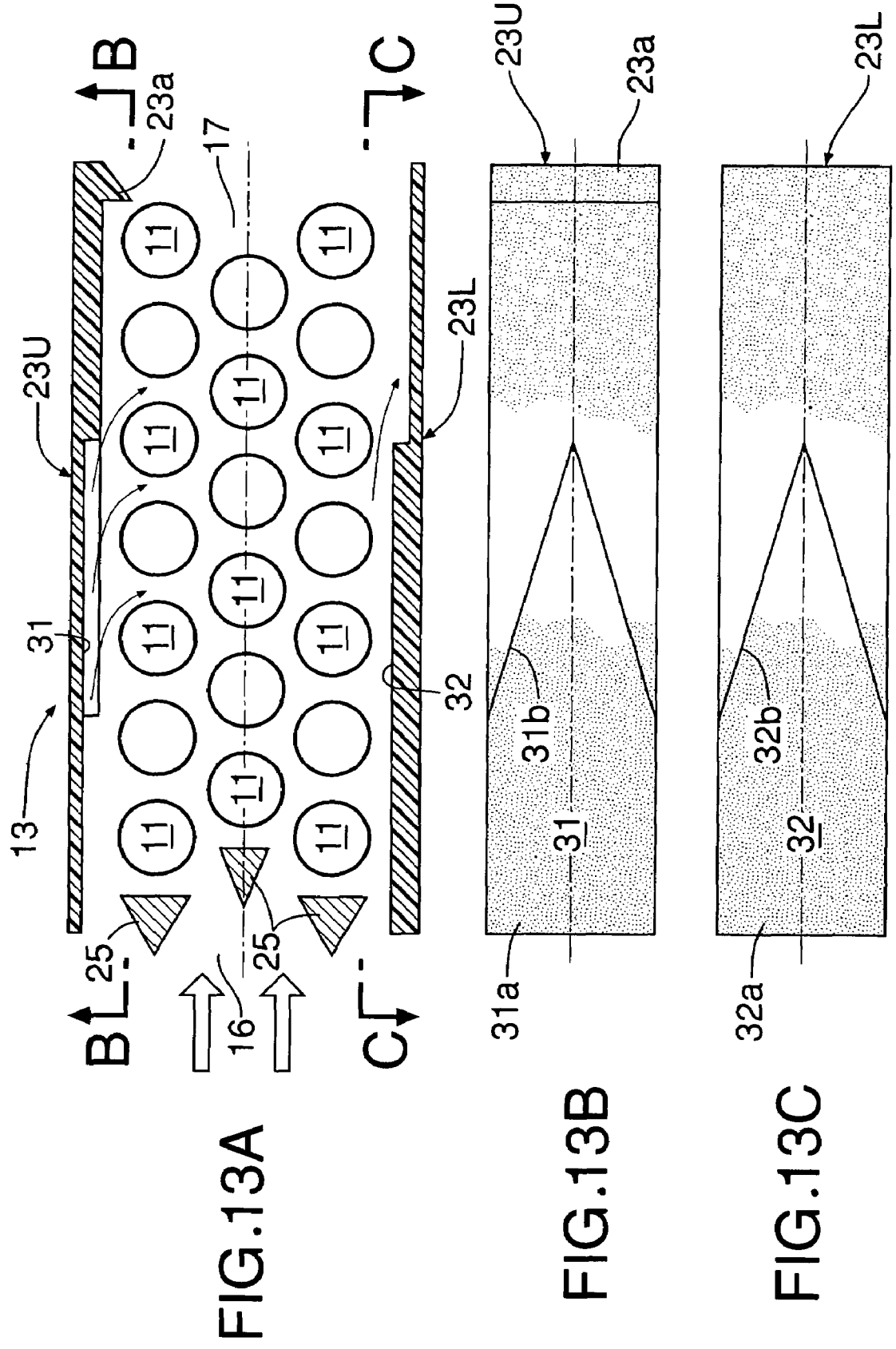

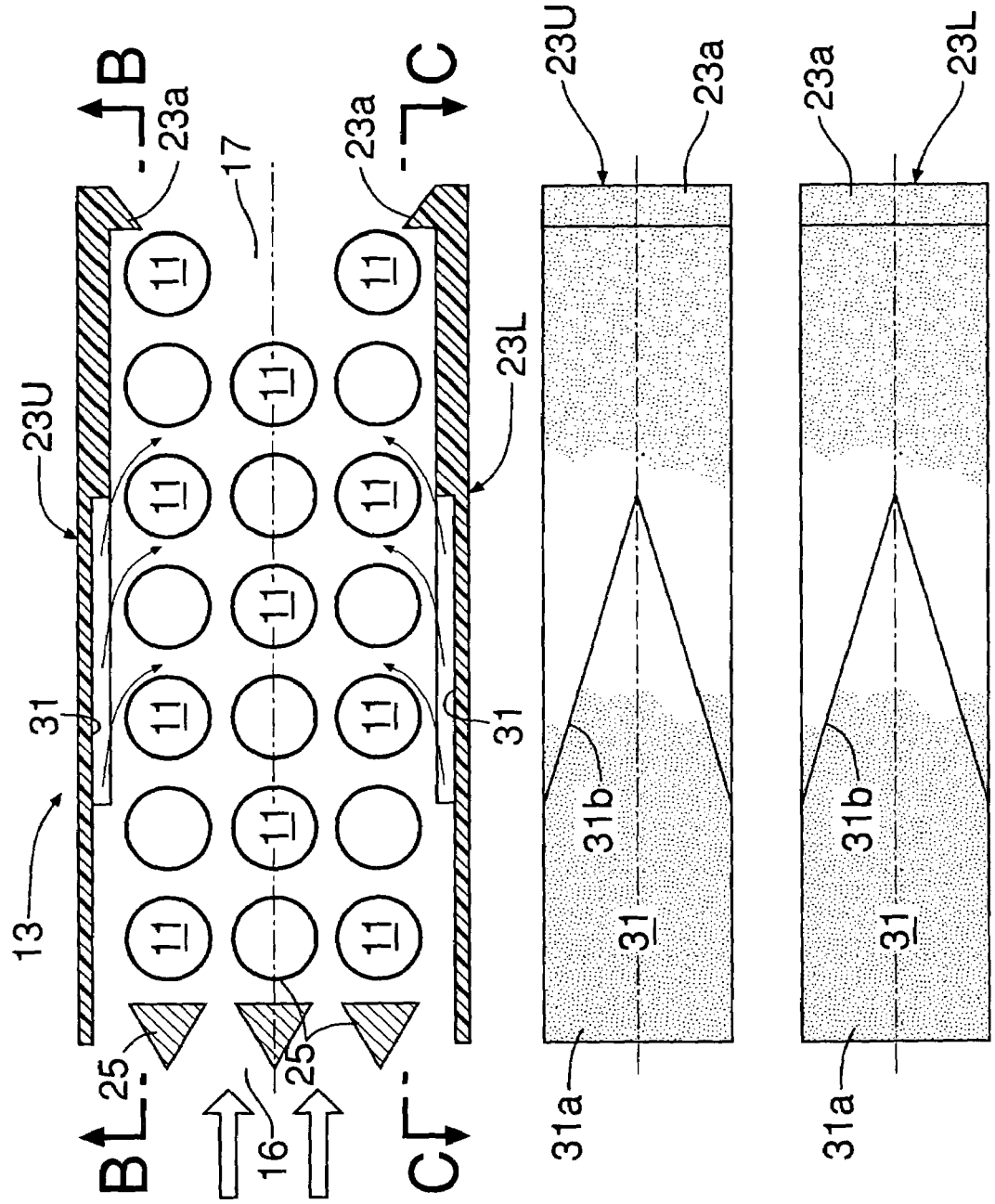

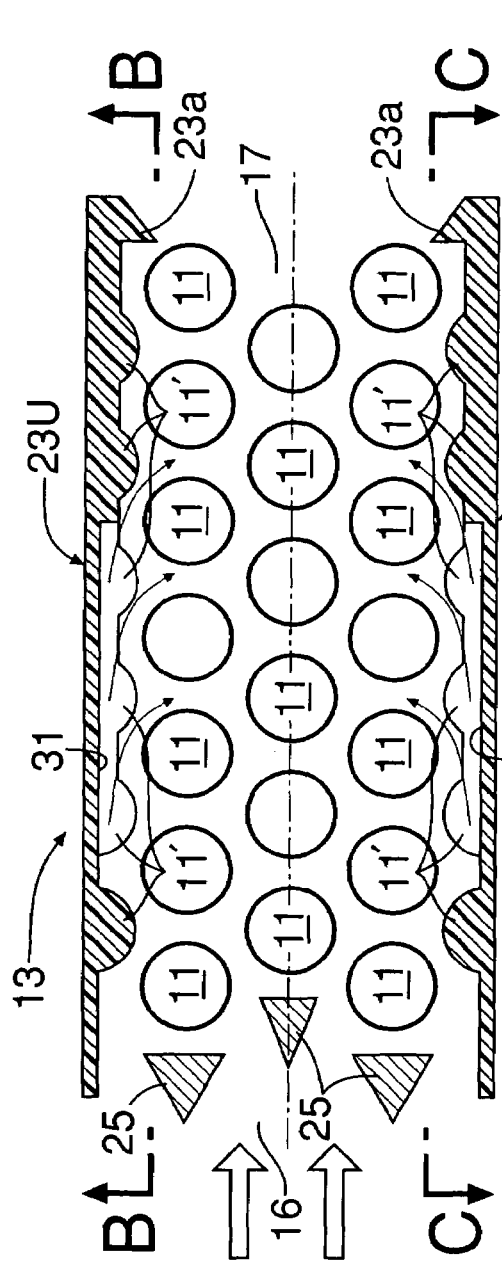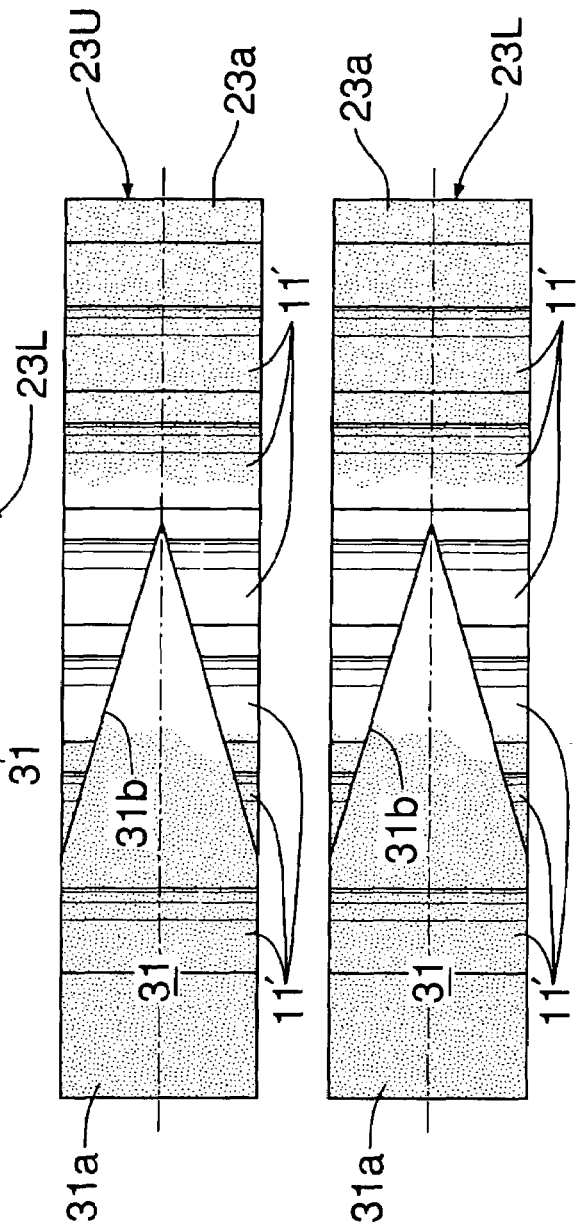
FIG.16A  FIG.16B  FIG.16C

BATTERY COOLING STRUCTURE

RELATED APPLICATION DATA

The Japanese priority application No. 2003-426515 upon which the present application is based is hereby incorporated in its entirety herein by reference.

BACKGROUND OF THE INVENTION

1. Field of the Invention

The present invention relates to a battery cooling structure in which a large number of rod-shaped battery modules are arranged in parallel to each other at predetermined intervals within a battery case, and these large number of battery modules are cooled with cooling air.

2. The Related Art

Japanese Patent Application Laid-open Nos. 10-255859 and 11-329518 disclose an arrangement in which a long rod-shaped battery module is formed by connecting a plurality of battery elements together in series, and a large number of the battery modules are arranged in parallel to each other at predetermined intervals within a battery case, the arrangement being employed as an energy source for a motor for travel of an electric automobile. Since these battery modules generate heat during charging and discharging, cooling is carried out by passing cooling air from a cooling air inlet at the front end of the battery case to a cooling air outlet at the rear end. Since the plurality of battery modules are arranged in multiple vertical rows and multiple tiers, and the cooling air flows from a front vertical row to a rear vertical row, the battery modules on the front vertical row side are cooled efficiently by contact with low temperature cooling air that has not yet carried out heat exchange, but the battery modules on the rear vertical row side contact cooling air whose temperature has been increased by heat exchange, so that they have difficulty to be cooled. In particular, among the battery modules on the rear vertical row side, the cooling effect to the battery modules in a middle tier, which are far from an inner face of the battery case, is degraded. In this way, the difference in cooling effect causes a variation in the temperature of the battery modules, leading to a problem that the capacity decreases or the durability is degraded.

In the arrangement disclosed in Japanese Patent Application Laid-open No. 10-255859, low temperature cooling air is replenished by connecting a bypass passage to a middle part, in the direction of flow of cooling air, of the battery case, and in the arrangement disclosed in Japanese Patent Application Laid-open No. 11-329518, the variation in the temperature is eliminated by replenishing low temperature cooling air via an opening formed in a middle part, in the direction of flow of cooling air, of the battery case so as to uniformly cool the battery modules on the upstream side and on the downstream side in the direction of flow of cooling air.

However, providing the bypass passage for introducing the cooling air gives rise to a problem that the structure of the battery case becomes complicated or the dimensions thereof increase, and providing the opening for introducing the cooling air also gives rise to a problem that the layout of the battery case is restricted in order not to block the opening.

SUMMARY OF THE INVENTION

The present invention has been accomplished under the above-mentioned circumstances, and it is an object thereof to uniformly cool a large number of battery modules while simplifying the battery case, reducing the dimensions thereof and ensuring a degree of freedom in the layout.

In order to attain this object, in accordance with a first aspect of the present invention, there is provided a battery cooling structure in which a large number of rod-shaped battery modules that are cooled with cooling air are arranged in parallel to each other at predetermined intervals within a battery case, the battery case being formed into the shape of a rectangular tube having a cooling air inlet and a cooling air outlet by means of a pair of first plates facing each other and a pair of second plates facing each other, opposite ends of the large number of battery modules being supported by the pair of first plates, wherein an inner face of at least one of the pair of second plates is provided with a cooling air guide channel whose flow-path cross sectional area decreases from the cooling air inlet side to the cooling air outlet side.

Furthermore, in accordance with a second aspect of the present invention, in addition to the first aspect, there is provided the battery cooling structure wherein the cooling air guide channel has a substantially V-shaped tapered portion whose channel width decreases from the upstream side to the downstream side of the flow of cooling air.

Moreover, in accordance with a third aspect of the present invention, in addition to the first or second aspect, there is provided the battery cooling structure wherein the depth of the cooling air guide channel is different between one second plate and the other second plate.

Furthermore, in accordance with a fourth aspect of the present invention, in addition to the first or second aspect, there is provided the battery cooling structure wherein the position of the downstream end, in the direction of flow of cooling air, of the cooling air guide channel is different between one second plate and the other second plate.

Moreover, in accordance with a fifth aspect of the present invention, in addition to the first or second aspect, there is provided the battery cooling structure wherein the further toward the downstream side of the flow of cooling air the shallower the depth of the cooling air guide channel of at least one of the second plates.

Furthermore, in accordance with a sixth aspect of the present invention, in addition to the first or second aspect, there is proposed the battery cooling structure wherein one of the second plates is provided with the cooling air guide channel, and the other second plate is provided with a protruding portion that faces the cooling air guide channel.

Moreover, in accordance with a seventh aspect of the present invention, in addition to the first or second aspect, there is provided the battery cooling structure wherein at least one of the second plates has a plurality of cooling air guide channels arranged side by side in a direction perpendicular to the direction of flow of cooling air.

Furthermore, in accordance with an eighth aspect of the present invention, in addition to the seventh aspect, there is provided the battery cooling structure wherein the battery module includes a plurality of battery elements connected together in series, and the downstream ends, in the direction of flow of cooling air, of the plurality of cooling air guide channels are oriented toward a section in which the battery elements are connected.

Moreover, in accordance with a ninth aspect of the present invention, in addition to the second aspect, there is provided the battery cooling structure wherein the cooling air guide channel has an enlarged portion on the upstream side, in the direction of flow of cooling air, in the tapered portion, the enlarged portion having an increased channel width.

Furthermore, in accordance with a tenth aspect of the present invention, in addition to the first or second aspect, there is provided the battery cooling structure wherein an inner face of at least one of the pair of second plates has formed thereon a projecting portion that simulates the shape and the arrangement of the battery modules.

Moreover, in accordance with an eleventh aspect of the present invention, in addition to any one of the first to the tenth aspects, there is provided the battery cooling structure wherein a flow-regulating member for suppressing contact of cooling air with the battery modules in the foremost vertical row is provided in the cooling air inlet of the battery case.

With the arrangement of the first aspect, the battery case housing the large number of rod-shaped battery modules arranged in parallel to each other at predetermined intervals is formed into the shape of a rectangular tube having the cooling air inlet and the cooling air outlet by means of the pair of first plates that support opposite ends of the battery modules and the pair of second plates that are combined with the pair of first plates; when cooling the battery modules by passing cooling air from the cooling air inlet to the cooling air outlet, since the inner face of at least one of the pair of second plates is provided with the cooling air guide channel whose flow-path cross sectional area decreases from the cooling air inlet side to the cooling air outlet side, it is possible to deflect the flow of cooling air by means of this cooling air guide channel toward a central part on the downstream side of the battery case, thereby effectively cooling the battery modules that receive a poor cooling effect as being disposed in a central part on the downstream side, and making uniform the temperature of the large number of battery modules so as to suppress variation in capacity and lifetime. Moreover, since it is not necessary to provide a bypass passage or an opening in a middle part, in the direction of flow of cooling air, of the battery case, it is possible to simplify the structure of the battery case, reduce the dimensions thereof and improve a degree of freedom in the layout.

With the arrangement of the second aspect, since the cooling air guide channel has the substantially V-shaped tapered portion whose channel width decreases from the upstream side to the downstream side of the flow of cooling air, this tapered portion pushes the cooling air out of the cooling air guide channel, thereby effectively deflecting the cooling air toward the central part on the downstream side of the battery case.

With the arrangement of the third aspect, since the depth of the cooling air guide channel is different between the two second plates, it is possible to make nonuniform the amounts of cooling air deflected from the two cooling air guide channels to the central part on the downstream side of the battery case, thus avoiding degradation of the cooling effect by the cooling air flows which are combined in the central part on the downstream side of the battery case to counteract each other.

With the arrangement of the fourth aspect, since the position of the downstream end, in the direction of flow of cooling air, of the cooling air guide channel is different between the two second plates, it is possible to make nonuniform the amounts of cooling air deflected from the two cooling air guide channels to the central part on the downstream side of the battery case, thus avoiding degradation of the cooling effect by the cooling air flows which are combined in the central part on the downstream side of the battery case to counteract each other.

With the arrangement of the fifth aspect, since the further toward the downstream side of the flow of cooling air the shallower the depth of the cooling air guide channel of at least one of the second plates, the effect of pushing the cooling air out of the cooling air guide channel and deflecting it toward the central part on the downstream side of the battery case can be further improved.

With the arrangement of the sixth aspect, since one of the second plates is provided with the cooling air guide channel, and the other is provided with the protruding portion, it is possible to smoothly deflect the cooling air from one of the second plates to the other, thus effectively cooling the battery modules disposed in the central part on the downstream side of the battery case.

With the arrangement of the seventh aspect, since at least one of the second plates is provided with the plurality of cooling air guide channels arranged side by side in the direction perpendicular to the direction of flow of cooling air, it is possible to deflect the cooling air at any position in the direction perpendicular to the direction of flow of cooling air.

With the arrangement of the eighth aspect, since the downstream ends, in the direction of flow of cooling air, of the plurality of cooling air guide channels are oriented to the section in which the plurality of battery elements forming the battery module are connected, it is possible to concentrate the cooling air on an area of the battery modules where heat is generated.

With the arrangement of the ninth aspect, since the enlarged portion having the increased channel width is provided on the upstream side of the tapered portion of the cooling air guide channel, it is possible to minutely control the distribution of the amount of cooling air deflected in the direction perpendicular to the direction of flow of the cooling air.

With the arrangement of the tenth aspect, since the inner face of at least one of the pair of second plates has formed thereon the projecting portion that simulates the shape and the arrangement of the battery modules, it is possible to deflect the cooling air that collides with the projecting portion toward the central part of the battery case, thereby further enhancing the effect of deflecting the cooling air in the cooling air guide channel.

With the arrangement of the eleventh aspect, since the flow-regulating member is provided in the cooling air inlet of the battery case, it is possible to suppress the contact of cooling air with the battery modules in the foremost vertical row, which are the most easily cooled, thereby reducing the difference in temperature from the battery modules that are difficult to cool.

The above-mentioned object, other objects, characteristics, and advantages of the present invention will become apparent from an explanation of preferred embodiments that will be described in detail below by reference to the attached drawings.

BRIEF DESCRIPTION OF THE DRAWINGS

FIG. 1 to FIGS. 4A to 4C show a first embodiment of the present invention;

FIG. 1 is a partially exploded perspective view of a battery box,

FIG. 2 is an exploded perspective view of the battery box,

FIG. 3 is a diagram showing the relationship between battery modules and air guide plates, and FIGS. 4A, 4B, and 4C are diagrams for explaining the shape and the operation of air guide plates according to the first embodiment.

FIGS. 5A, 5B, and 5C are diagrams for explaining the shape and the operation of air guide plates according to a second embodiment.

FIGS. 7A, 7B, and 7C are diagrams for explaining the shape and the operation of air guide plates according to a fourth embodiment.

FIGS. 8A, 8B, and 8C are diagrams for explaining the shape and the operation of air guide plates according to a fifth embodiment.

FIGS. 11A, 11B, and 11C are diagrams for explaining the shape and the operation of air guide plates according to an eighth embodiment.

FIGS. 13A, 13B, and 13C are diagrams for explaining the shape and the operation of air guide plates according to a ninth embodiment.

FIGS. 15A, 15B, and 15C are diagrams showing another modified example of the first embodiment.

FIG. 16A, 16B, and 16C are diagrams for explaining the shape and the operation of air guide plates according to a tenth embodiment.

DESCRIPTION OF THE PREFERRED EMBODIMENTS

A first embodiment is now explained with reference to FIGS. 1 to 4C.

Figure 1:
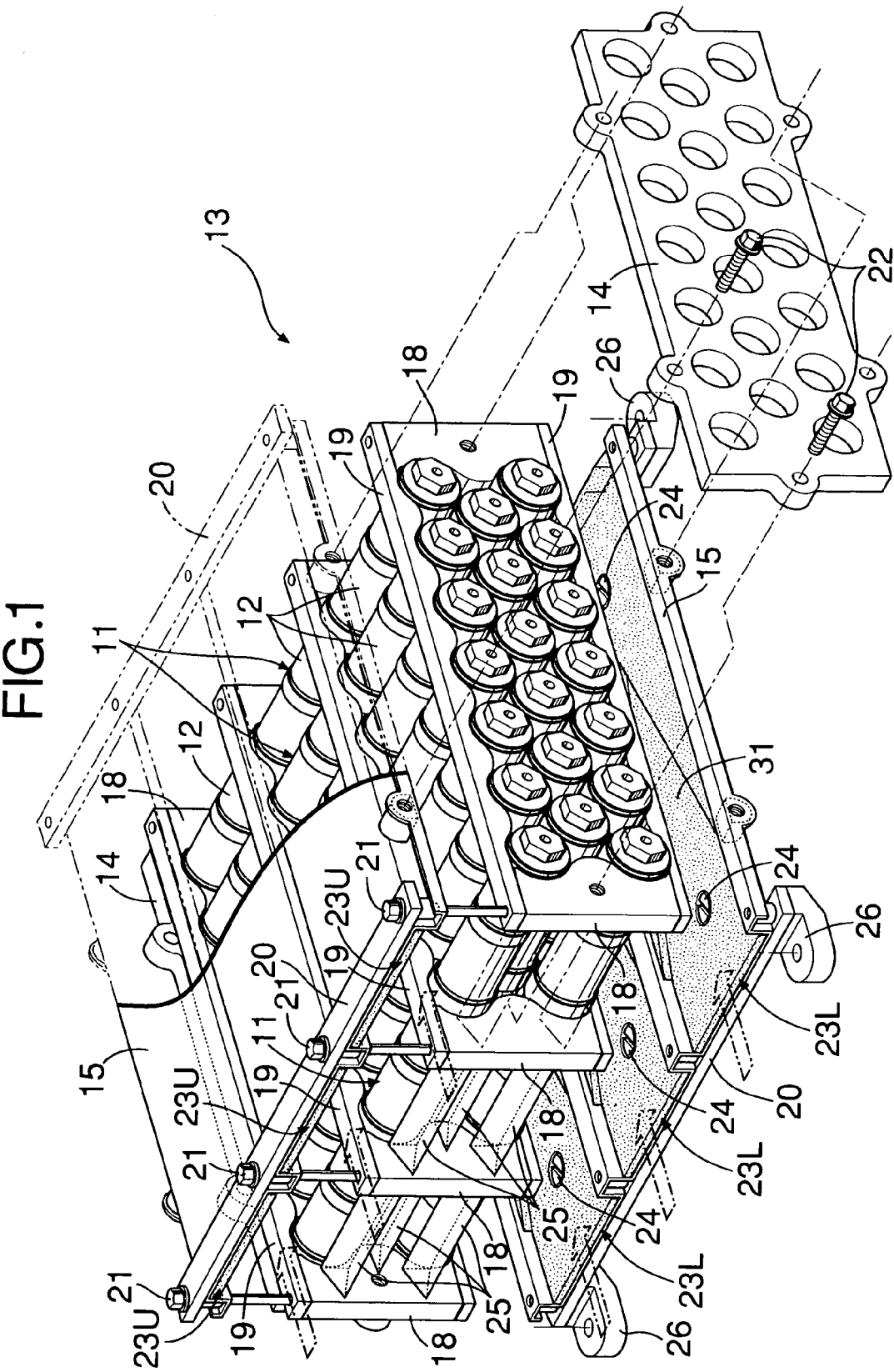
Figure 6A:
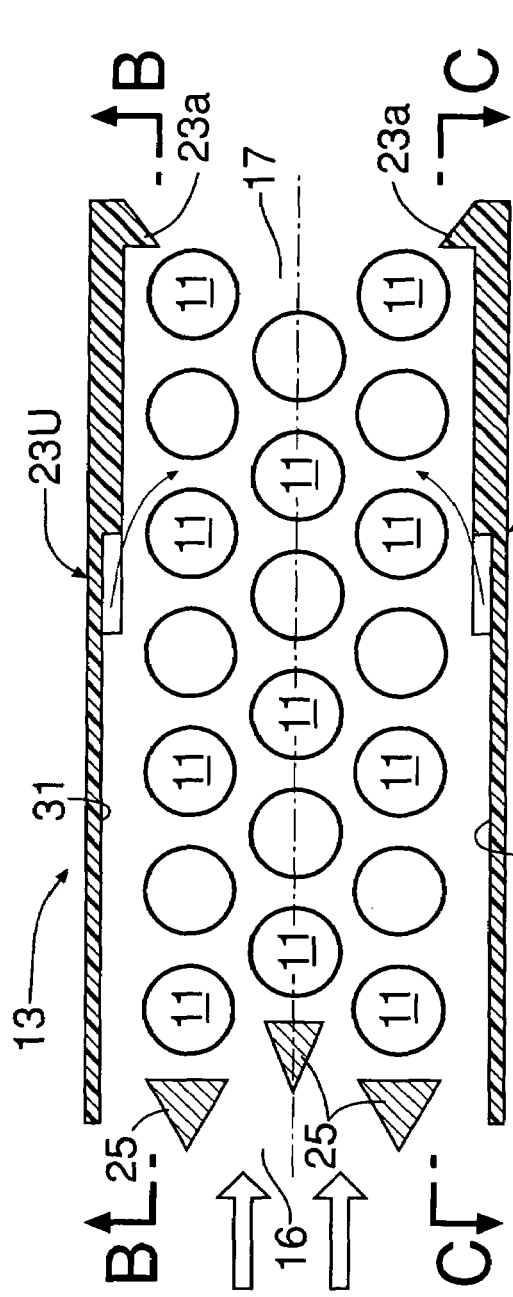
FIGS. 6A, 6B, and 6C are diagrams for explaining the shape and the operation of air guide plates according to a third embodiment.
Figure 6B:
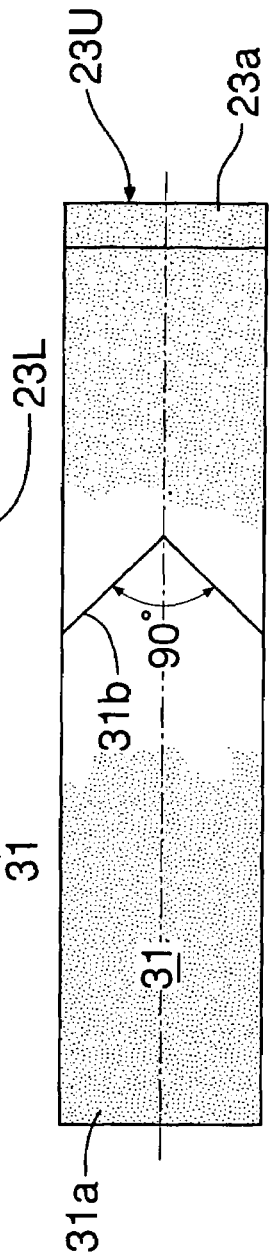
Figure 6C:
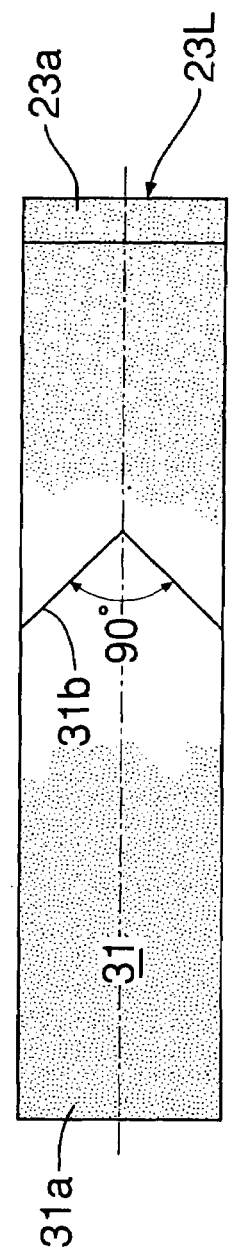

As shown in FIG. 1 and FIG. 2, a battery module 11, which serves as a power source for a hybrid vehicle motor/generator, is formed by integrally connecting together in series a plurality (six in this embodiment) of cylindrical battery elements 12 made of, for example, NiMH batteries into a rod shape, and twenty battery modules 11 are arranged in a staggered manner so that there are seven in an upper tier, six in a middle tier, and seven in a lower tier.

A battery case 13 for supporting the 20 battery modules 11 is made in the shape of substantially rectangular tube having a pair of rectangular first plates 14 forming left and right side faces of the battery case 13 and a pair of second plates 15 providing a horizontal connection between upper ends and between lower ends of the two first plates 14. Front and rear ends of the substantially rectangular tube-shaped battery case 13 are open; the front end is provided with a cooling air inlet 16 (see FIG. 4A), and the rear end is provided with a cooling air outlet 17 (see FIG. 4A). Cooling air is supplied to the cooling air inlet 16 via a cooling fan, which is not illustrated.

A pair of front and rear support members 18 and a pair of upper and lower beam members 19 are combined into a frame. These four frames, while being arranged between the pair of second plates 15 in the front-to-rear direction, are secured by four bolts 21 running through reinforcing members 20 reinforcing upper and lower faces of the pair of second plates 15 at the front end, and are also secured by four bolts 21 running through reinforcing members 20 reinforcing upper and lower faces of the pair of second plates 15 at the rear end. The pair of first plates 14 are each secured to side faces of the pair of second plates 15 and left and right ends of the support members 18 via six bolts 22.

The seven battery modules 11 in the upper tier and the seven battery modules 11 in the lower tier are positioned by being fitted in wave-shaped depressions on inner faces of the support members 18 and the beam members 19 that are combined into the frame. Opposite ends of all of the battery modules 11, including the six battery modules 11 in the middle tier, are positioned by being fitted into openings formed in the pair of first plates 14.

Three synthetic resin air guide plates 23U and 23L are secured to an inner face of each second plate 15 by two bolts 24 per air guide plate. Formed on each of the air guide plates 23U and 23L is a cooling air guide channel 31 formed from a fixed width parallel portion 31a positioned on the cooling air inlet 16 side, and a tapered portion 31b which is positioned on the cooling air outlet 17 side and is tapered into a V-shape toward the rear. The downstream end of the cooling air guide channel 31, which has a constant depth, extends to a position slightly rear of the center in the longitudinal direction of the air guide plate 23U or 23L, and an angle V of the downstream end is 33°. Formed on an end portion of each of the air guide plates 23U and 23L on the cooling air outlet 17 side is a bank-shaped projection 23a, which is bent inwardly.

Nine triangular section flow-regulating members 25 are fixed to the cooling air inlet 16 of the battery case 13 in three tiers so as to provide a connection between the four support members 18. Four brackets 26 for fixing the battery case 13 to a vehicle body are provided at left and right ends of the front and rear reinforcing members 20 on the lower side of the second plate 15.

The operation of the first embodiment having the above-mentioned arrangement is now explained.

When the motor/generator is driven as a motor accompanying travel of the hybrid vehicle, the battery modules 11 discharge. When the motor/generator is driven as a generator, the battery modules 11 are charged. In either case, since the capacity and the durability of the battery modules 11 are degraded because of the generation of heat, cooling air is supplied into the cooling air inlet 16 via a cooling fan, which is not illustrated, so as to cool the battery modules 11.

As shown in FIG. 4A, the cooling air supplied into the cooling air inlet 16 is deflected up and down by the three tiers of flow-regulating members 25 arranged in front of the three battery modules 11 in the foremost vertical row; forced to flow in spaces formed between the pair of second plates 15 and the battery modules 11 while avoiding direct collision with the three battery modules 11 in the foremost vertical row; and discharged through the cooling air outlet 17. The flow-regulating members 25 prevent the cooling air from colliding with the battery modules 11 in the foremost vertical row and being disturbed, and have the function of suppressing cooling of the battery modules 11 in the foremost vertical row, which are the most easily cooled, thus decreasing the difference in temperature from the other battery modules 11.

While the cooling air flows through the battery case 13, the battery modules 11 that come into contact with the cooling air are cooled. However, since the temperature of the cooling air is increasing toward the downstream side of the battery case 13, the cooling effect to the battery modules 11 gradually deteriorates. In particular, since it is difficult for the battery modules 11 in the middle tier, which are far from the pair of second plates 15, to contact the cooling air, the temperature of the three battery modules 11 on the rear side of the middle tier shown by the hatching in FIG. 4A increases abnormally, which might provide a degraded performance.

However, in accordance with this embodiment, the cooling air flowing through the tapered cooling air guide channels 31 of the six air guide plates 23U and 23L provided on the inner faces of the pair of second plates 15 is guided toward the battery modules 11 in the middle tier from the vicinity of a middle part in the front-to-rear direction of the battery case 13, because the flow-path cross sectional area of the tapered portion 31b of each of the cooling air guide channels 31 narrows as it goes toward the downstream side. Therefore, it is possible to effectively cool the three battery modules 11 for which the cooling efficiency is low and which are shown by the hatching in FIG. 4A, thus suppressing increase in temperature thereof and to prevent degradation in performance.

TABLE 1

| | Maximum temperature (° C.) | Temperature difference (° C.) | Module having the maximum temperature |
|---|---|---|---|
| Comparative Example | 53.9 | 8.2 | Middle tier, fifth from front |
| Embodiment 1 | 49.7 | 5.2 | Middle tier, fifth from front |
| Embodiment 2 | 50.5 | 6.0 | Middle tier, fourth from front |
| Embodiment 3 | 52.5 | 8.0 | Middle tier, third from front |
| Embodiment 4 | 51.1 | 6.3 | Middle tier, third from front |
| Embodiment 5 | 49.9 | 5.2 | Middle tier, third from front |
| Embodiment 6 | 50.2 | 5.7 | Middle tier, fourth from front |
| Embodiment 7 | 49.4 | 4.8 | Middle tier, fifth from front |
| Embodiment 8 | 49.8 | 4.9 | Middle tier, fifth from front |
| Embodiment 9 | 50.3 | 6.6 | Middle tier, sixth from front |
| Embodiment 10 | 47.5 | 4.8 | Lower tier, seventh from front |

Table 1 shows a comparison of the effects of a comparative example and embodiments (first embodiment to tenth embodiment). In the comparative example air guide plates 23U and 23L have no cooling air guide channel 31, but instead a bypass passage for guiding cooling air from a cooling air inlet 16 to a position rear of the central part of the battery case 13 along the pair of second plates 15 is provided, so that the cooling air supplied from this bypass passage is employed to improve the cooling performance of the battery modules 11 on the rear side of the middle tier, for which the cooling efficiency is low. The maximum temperature referred to here is the temperature of the module, among the twenty battery modules 11, that has reached the highest temperature, and the temperature difference referred to here is the difference in temperature between the battery module 11 (usually battery module 11 in the foremost vertical row) having the lowest temperature and the battery module 11 having the highest temperature. It can therefore be said that the lower the maximum temperature and the smaller the temperature difference, the higher the cooling performance.

The maximum temperature of the battery module 11 in the middle tier of the fifth vertical row from the front, which had the highest temperature in the comparative example employing the bypass passage, was 53.9° C. and the temperature difference was 8.2° C., whereas in the first embodiment the maximum temperature of the battery module 11 in the middle tier of the fifth vertical row from the front, which had the highest temperature, was decreased to 49.7° C. and the temperature difference was decreased to 5.2° C., thus confirming that the cooling performance was improved.

As hereinbefore described, in accordance with this embodiment, since it is not necessary to provide a bypass passage or an opening in a middle part, in the direction of flow of cooling air, of the battery case 13, it is possible to simplify the structure of the battery case 13, reduce the dimensions, and improve a degree of freedom in the layout thereof.

FIGS. 5A to 5C and 6A to 6C show a second embodiment and a third embodiment of the present invention, respectively.

In the second embodiment, the angle V at the downstream end of a cooling air guide channel 31 of each of air guide plates 23U and 23L is changed to 50° from the 33° of the first embodiment. In the third embodiment the angle V at the downstream end of a cooling air guide channel 31 of each of air guide plates 23U and 23L is changed to 90° from the 33° of the first embodiment. As is clear from Table 1, in the second embodiment the maximum temperature of the battery module 11 in the middle tier of the fourth vertical row from the front, which had the highest temperature, was decreased to 50.5° C. and the temperature difference was decreased to 6.0° C., and in the third embodiment the maximum temperature of the battery module 11 in the middle tier of the third vertical row from the front, which had the highest temperature, was decreased to 52.5° C. and the temperature difference was decreased to 8.0° C.

It can therefore be seen that, among the first to the third embodiments, the cooling effect of the first embodiment was the highest, the cooling effect of the second embodiment was next, and the cooling effect of the third embodiment was the lowest.

FIGS. 7A, 7B, and 7C show a fourth embodiment of the present invention. Deep cooling air guide channels 31 are formed so as to have a depth of 11 mm in upper air guide plates 23U, and shallow ones are formed so as to have a depth of 5.5 mm in lower air guide plates 23L. As a result, the flow rate of the cooling air blowing down from the cooling air guide channels 31 of the upper air guide plates 23U is higher than the flow rate of the cooling air blowing up from the cooling air guide channels 31 of the lower air guide plates 23L, thereby preventing the flow of cooling air from becoming sluggish in the vicinity of the battery modules 11 in the middle tier, to enhance the cooling effect.

As is clear from Table 1, in the fourth embodiment the maximum temperature of the battery module 11 in the middle tier of the third vertical row from the front, which had the highest temperature, was decreased to 52.1° C. and the temperature difference was decreased to 6.3° C.

FIGS. 8A, 8B, and 8C show a fifth embodiment of the present invention, in which the position of the downstream ends of cooling air guide channels 31 of lower air guide plates 23L are displaced, relative to the downstream ends of cooling air guide channels 31 of upper air guide plates 23U, to the upstream side by a distance corresponding to the pitch at which battery modules 11 are arranged in the front-to-rear direction. Since the positions of the upstream ends of tapered portions 31b of the upper and lower cooling air guide channels 31 are the same, an angle V of the lower cooling air guide channels 31 is larger than an angle V of the upper cooling air guide channels 31. As a result, the position at which the cooling air blows down from the cooling air guide channels 31 of the upper air guide plates 23U is displaced from the position at which the cooling air blows up from the cooling air guide channels 31 of the lower air guide plates 23L, thereby preventing the cooling air from the upper direction and the cooling air from the lower direction from counteracting each other in the vicinity of the battery modules 11 in the middle tier, to prevent the flow of cooling air from becoming sluggish, whereby the cooling effect to the battery modules 11 is enhanced.

As is clear from Table 1, in the fifth embodiment the maximum temperature of the battery module 11 in the middle tier of the third vertical row from the front, which had the highest temperature, was decreased to 49.9° C. and the temperature difference was decreased to 5.2° C.

Figures 9A, 9B, 9C:
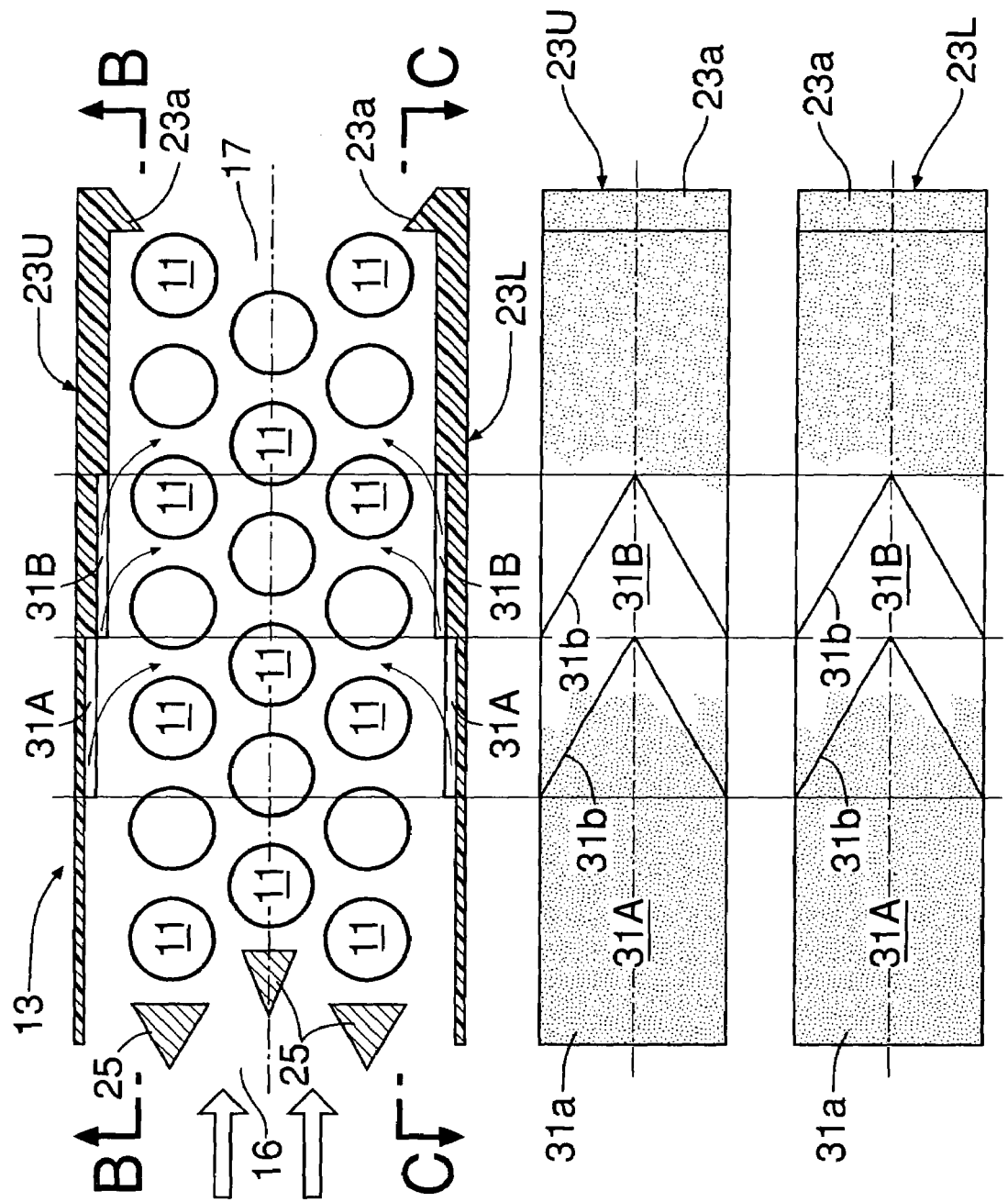
FIGS. 9A, 9B, and 9C are diagrams for explaining the shape and the operation of air guide plates according to a sixth embodiment.

FIGS. 9A, 9B, and 9C show a sixth embodiment of the present invention, in which the depth of cooling air guide channels 31A and 31B changes in two steps. That is, the cooling air guide channels 31A on the upstream side close to a cooling air inlet 16 are deep and have a V-shaped extremity of 50°, and the cooling air guide channels 31B extending from the rear of the cooling air guide channels 31A to the downstream side are shallow and similarly have a V-shaped extremity of 50°. In this way, since the cooling air guide channels 31A and 31B are made so as to form a plurality of steps so that the depth becomes gradually shallower from the upstream side to the downstream side, it is possible to deflect the cooling air inward more smoothly, thereby further improving the cooling effect to the battery modules 11 in the middle tier. In particular, by arranging the downstream ends of the cooling air guide channels 31B on the downstream side directly in front of the battery module 11 that most requires the cooling, it is possible to effectively cool the battery module 11.

As is clear from Table 1, in the sixth embodiment the maximum temperature of the battery module 11 in the middle tier of the fourth vertical row from the front, which had the highest temperature, was decreased to 50.2° C. and the temperature difference was decreased to 5.7° C.

Figures 10A, 10B, 10C:
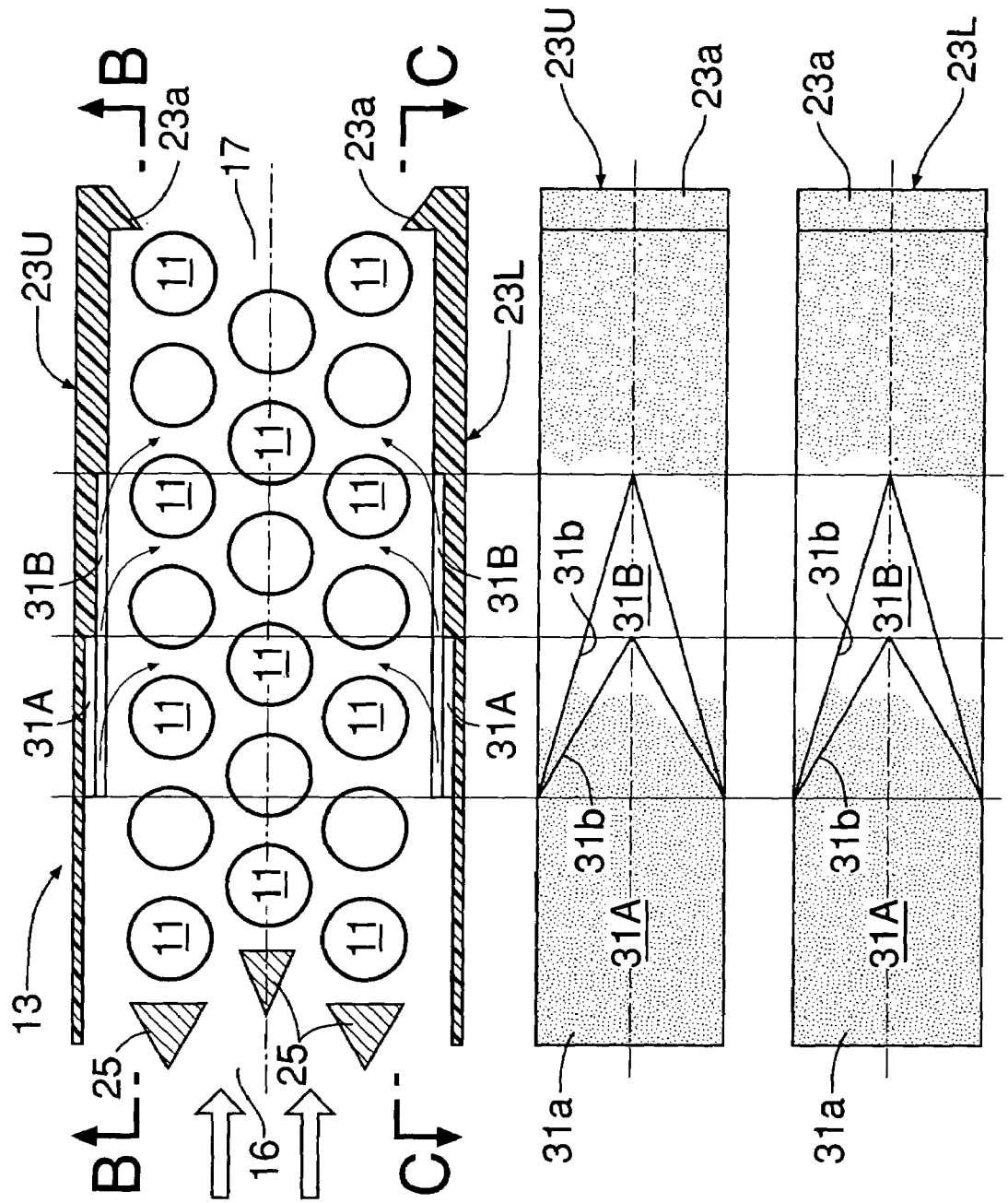
FIGS. 10A, 10B, and 10C are diagrams for explaining the shape and the operation of air guide plates according to a seventh embodiment.

FIGS. 10A, 10B, and 10C show a seventh embodiment of the present invention. Also in this seventh embodiment, the depth of cooling air guide channels 31A and 31B changes in two steps, but since the starting positions of the two cooling air guide channels 31A and 31B are the same, an angle V of a tapered portion 31b of the cooling air guide channels 31A on the upstream side is large, and an angle V of the cooling air guide channels 31B on the downstream side, which are formed only from the tapered portion 31b, is small. This seventh embodiment gives the same operational effect as that of the sixth embodiment.

As is clear from Table 1, in the seventh embodiment the maximum temperature of the battery module 11 in the middle tier of the fifth vertical row from the front, which had the highest temperature, was decreased to 49.4° C. and the temperature difference was decreased to 4.8° C.

FIGS. 11A, 11B, and 11C show an eighth embodiment of the present invention. In this eighth embodiment, each of air guide plates 23U and 23L has three cooling air guide channels 31C to 31E. Among these cooling air guide channels 31C to 31E, the cooling air guide channel 31D, which is in the middle in the left-and-right direction, extends most to the downstream side. Generally in battery elements 12 that form battery modules 11, a section where a positive electrode and a negative electrode are connected together easily generates heat because of contact resistance, but in accordance with this embodiment, since cooling air can be oriented to a desired position in the left-and-right direction (longitudinal direction) of the battery modules 11, it is possible to concentrate the cooling air on a high temperature section of the battery modules 11.

As is clear from Table 1, in the eighth embodiment the maximum temperature of the battery module 11 in the middle tier of the fifth vertical row from the front, which had the highest temperature, was decreased to 49.8° C. and the temperature difference was decreased to 4.9° C.

Figure 12A:
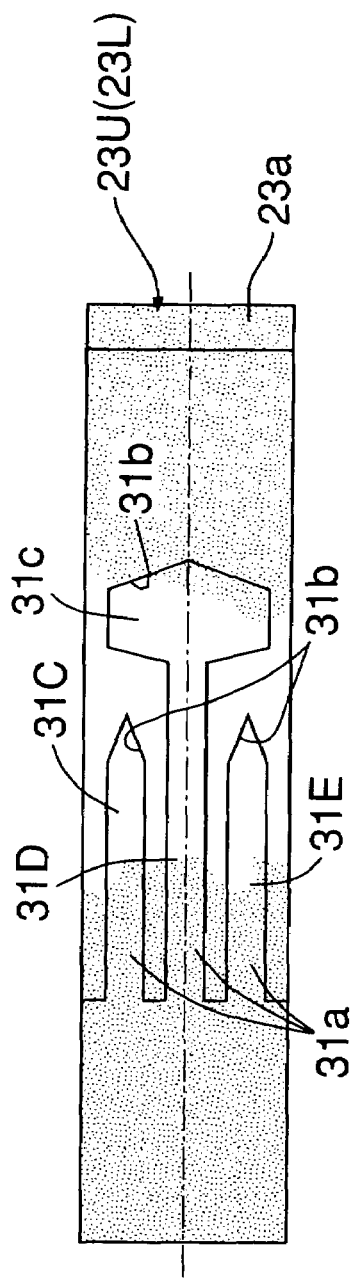
FIGS. 12A, 12B, and 12C are diagrams showing a modified example of the eighth embodiment.
Figure 12B:
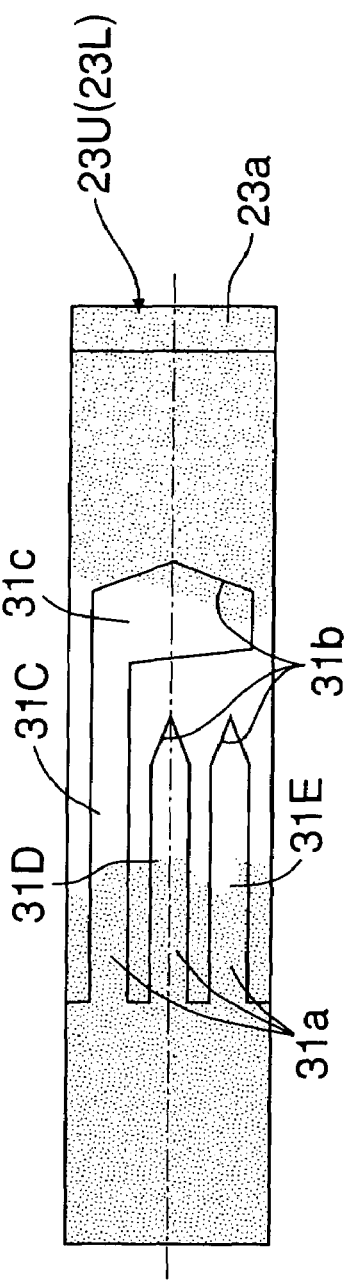
Figure 12C:
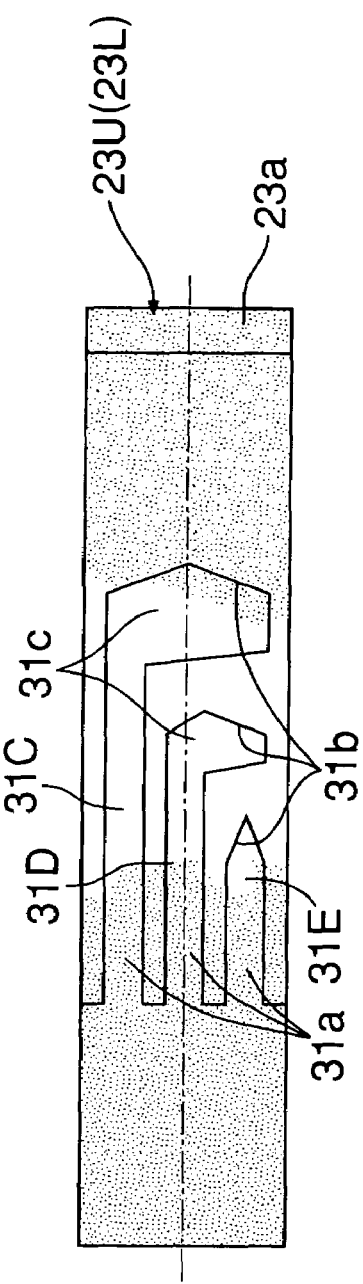

FIGS. 12A, 12B, and 12C are modified examples of the eighth embodiment. A downstream section of one or two of the three cooling air guide channels 31C to 31E provided in each of the air guide plates 23U and 23L is first enlarged and then tapered into a V shape. In the example of FIG. 12A, a cooling air guide channel 31D in the middle has an enlarged portion 31c, in the example of FIG. 12B a cooling air guide channel 31C on one side has an enlarged portion 31c, and in the example of FIG. 12C cooling air guide channels 31C and 31D on one side and in the middle have enlarged portions 31c. In this way, since the downstream portion of a given one of the cooling air guide channels 31C to 31E is first enlarged and then tapered into a V shape, it is possible to further distribute in the left-and-right direction the cooling air that has been distributed into the three cooling air guide channels 31C to 31E arranged side by side in the left-and-right direction, thereby minutely controlling the distribution density of the cooling air in the left-and-right direction.

FIGS. 13A, 13B, and 13C show a ninth embodiment of the present invention. In the first to the eighth embodiments the upper and lower air guide plates 23U and 23L both have cooling air guide channels 31, and 31A to 31E, but in the ninth embodiment upper air guide plates 23U have cooling air guide channels 31, and lower air guide plates 23L have protruding portions 32. The protruding portions 32 have the same shape as that of the cooling air guide channels 31, and are formed from a parallel portion 32a and a tapered portion 32b. Furthermore, there is no projection 23a at the rear end of the lower air guide plates 23L.

In accordance with this ninth embodiment, the upper air guide plates 23U deflect the flow of cooling air in the rear half of the battery case 13 by the effect of the cooling air guide channels 31, and this tendency is further promoted by the protruding portions 32 of the lower air guide plates 23L. As a result, the cooling air efficiently comes into contact with the battery modules 11 positioned in a rear part of the middle tier, for which contact with the cooling air is difficult.

As is clear from Table 1, in the fourth embodiment the maximum temperature of the battery module 11 in the middle tier of the sixth vertical row from the front, which had the highest temperature, was decreased to 50.3° C. and the temperature difference was decreased to 6.6° C.

FIGS. 14A, 14B, 14C, 14D, and 14E show modified examples of the first embodiment. In the first embodiment the tapered portion 31b of the cooling air guide channel 31 is made into a simple tapered shape, but in these modified examples the shapes of tapered portions 31b are different.

Figure 14A:
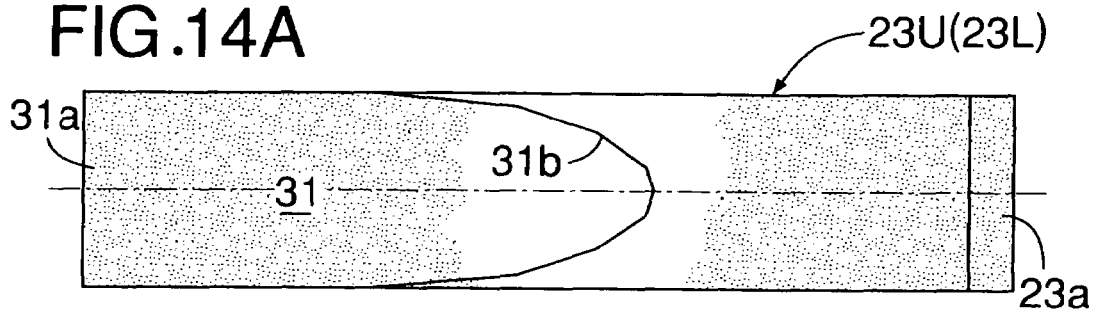
FIGS. 14A, 14B, 14C, 14D, and 14E are diagrams showing modified examples of the first embodiment.
Figure 14B:
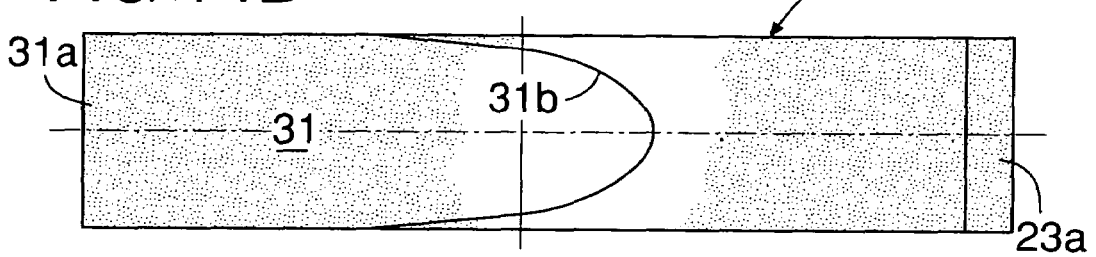
Figure 14C:
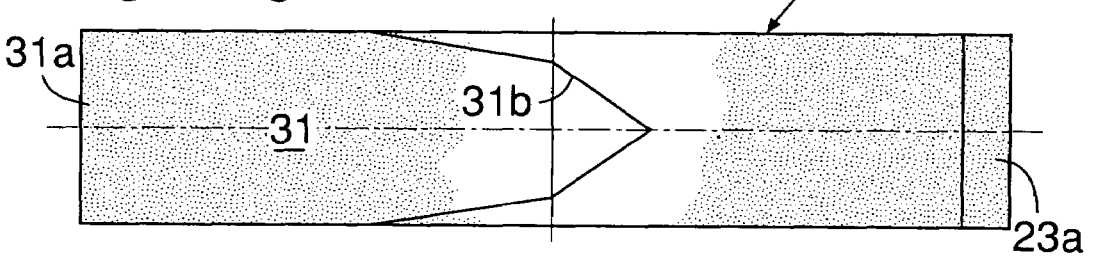
Figure 14D:
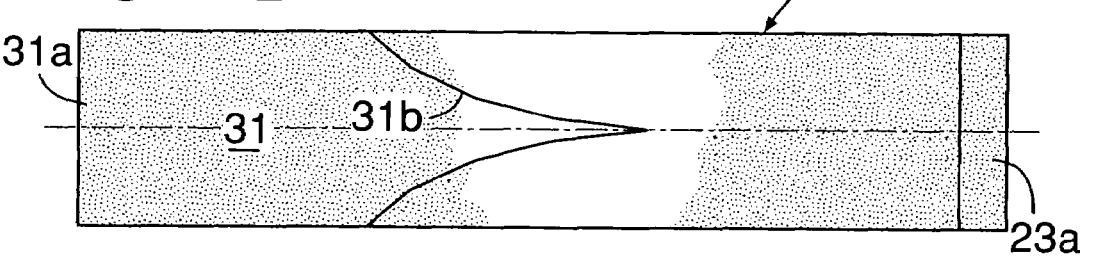
Figure 14E:
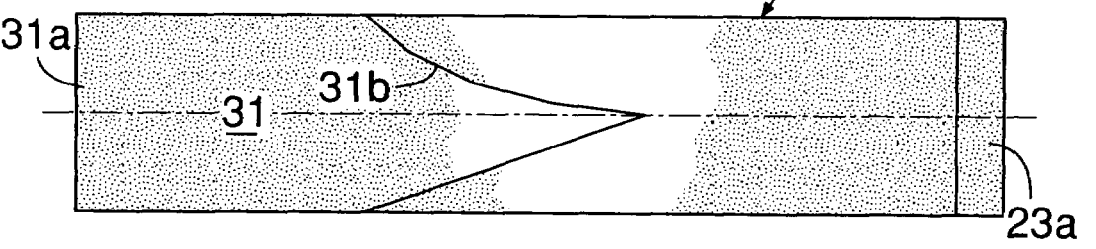

In the example of FIG. 14A, a tapered portion 31b has a generally convex shape formed by combining a plurality of straight lines, in the example of FIG. 14B a tapered portion 31b has a generally convex shape formed by combining straight lines on the upstream side and a curved line on the downstream side, in the example of FIG. 14C a tapered portion 31b has a two-step tapered shape, in the example of FIG. 14D a tapered portion 31b has a generally concave shape formed by combining a plurality of straight lines, and in the example of FIG. 14E one of the left and right sides of a tapered portion 31b is formed from one straight line and the other has a concave shape formed from a plurality of straight lines.

In these modified examples, the effect of the tapered portion 31b in deflecting the cooling air in the vertical direction is the highest for the modified example of FIG. 14A, and decreases in the order A→B→C→D→E. Furthermore, as in the modified example of FIG. 14E, when the shape of the tapered portion 31b is asymmetric in the left-and-right direction, the cooling air can be oriented to any position in the longitudinal direction of the battery modules 11, thereby effectively cooling a high temperature section.

FIGS. 15A, 15B, and 15C show another modified example of the first embodiment. In the first embodiment, the battery modules 11 are arranged in a staggered manner, but in this modified example battery modules 11 are arranged in a grid manner. This modified example can also attain the same operational effect as that of the first embodiment.

FIGS. 16A, 16B, and 16C show a tenth embodiment of the present invention. In this tenth embodiment each of air guide plates 23U and 23L is provided on an inner face thereof with semicylindrical projections 11', which function as dummy battery modules 11. These projections 11' are arranged in a staggered manner relative to the battery modules 11. By providing the projections 11', it is possible to make the state of the space between the inner face of each of the air guide plates 23U and 23L and the battery modules 11 the same as that of the space between the battery modules 11 in the upper, middle, and lower tiers. Formed on the inner face of each of the air guide plates 23U and 23L is a cooling air guide channel 31, which is formed from a parallel portion 31a and a tapered portion 31b by cutting off a portion of the projections 11'.

In accordance with this tenth embodiment, since the projections 11' arranged in the staggered manner relative to the battery modules 11 have the function of pushing the cooling air into spaces between the upper and lower tier battery modules 11 that are adjacent in the front-to-rear direction, the cooling effect to the battery modules 11 in the middle tier can be further improved, in combination with the function of the cooling air guide channels 31 of pushing in the cooling air.

As is clear from Table 1, in the tenth embodiment the maximum temperature of the battery module 11 in the middle tier of the seventh vertical row from the front, which had the highest temperature, was decreased to 47.5° C. and the temperature difference was decreased to 4.8° C.

Although embodiments of the present invention has been described detail, the present invention can be modified in a variety of ways without departing from the spirit and scope of the present invention.

For example, any combination of the aspects of the above embodiments is also an embodiment of the present invention.

Furthermore, in the sixth embodiment and the seventh embodiment, the depths of the cooling air guide channels 31A and 31B are changed in two steps, but they may be changed in three or more steps, or they may be continuously changed.

What is claimed is:

1. A battery cooling structure, in which a large number of rod-shaped battery modules, cooled with cooling air, are disposed parallel to one another, said battery cooling structure comprising:
a battery case formed in a rectangular shape, having a cooling air inlet and a cooling air outlet opposed to one another, said battery case including,
(a) a pair of opposing first plates, said pair of first plates supporting opposite ends of said battery modules, and
(b) a pair of opposing second plates, said first plates and said second plates cooperatively forming an inner surface of said rectangularly shaped battery case,
wherein an inner surface of at least one of said pair of second plates includes a cooling air guide channel having at least a partially tapered recess formed into said inner surface,
wherein a width of said recess decreases from a cooling air inlet side to a cooling air outlet side.

2. The battery cooling structure according to claim 1, wherein the cooling air guide channel has a substantially V-shaped tapered portion whose channel width decreases from a upstream side to a downstream side of the flow of cooling air.

3. The battery cooling structure according to claim 1 or 2, wherein the depth of the cooling air guide channel is different between one second plate and the other second plate.

4. The battery cooling structure according to claim 1 or 2, wherein the position of a downstream end, in the direction of flow of cooling air, of the cooling air guide channel is different between one second plate and the other second plate.

5. The battery cooling structure according to claim 1 or 2, wherein the further toward a downstream side of the flow of cooling air the shallower the depth of the cooling air guide channel of at least one of the second plates.

6. The battery cooling structure according to claim 1 or 2, wherein one of the second plates is provided with the cooling air guide channel and the other second plate is provided with a protruding portion that faces the cooling air guide channel.

7. The battery cooling structure according to claim 1 or 2, wherein at least one of the second plates has a plurality of cooling air guide channels arranged side by side in a direction perpendicular to the direction of flow of cooling air.

8. The battery cooling structure according to claim 7, wherein the battery module includes a plurality of battery elements connected together in series, and the downstream ends, in the direction of flow of cooling air, of the plurality of cooling air guide channels are oriented toward a section in which the battery elements are connected.

9. The battery cooling structure according to claim 2, wherein the cooling air guide channel has an enlarged portion on the upstream side, in the direction of flow of cooling air, of the tapered portion, the enlarged portion having an increased channel width.

10. The battery cooling structure according to claim 1 or 2, wherein an inner face of at least one of the pair of second plates has formed thereon a projecting portion that simulates the shape and the arrangement of the battery modules.

11. The battery cooling structure according to claim 1, wherein a flow-regulating member for suppressing contact of cooling air with the battery modules in the foremost vertical row is provided in the cooling air inlet of the battery case.

12. The battery cooling structure according to claim 2, wherein a flow-regulating member for suppressing contact of cooling air with the battery modules in the foremost vertical row is provided in the cooling air inlet of the battery case.

13. The battery cooling structure according to claim 3, wherein a flow-regulating member for suppressing contact of cooling air with the battery modules in the foremost vertical row is provided in the cooling air inlet of the battery case.

14. The battery cooling structure according to claim 4, wherein a flow-regulating member for suppressing contact of cooling air with the battery modules in the foremost vertical row is provided in the cooling air inlet of the battery case.

15. The battery cooling structure according to claim 5, wherein a flow-regulating member for suppressing contact of cooling air with the battery modules in the foremost vertical row is provided in the cooling air inlet of the battery case.

16. The battery cooling structure according to claim 6, wherein a flow-regulating member for suppressing contact of cooling air with the battery modules in the foremost vertical row is provided in the cooling air inlet of the battery case.

17. The battery cooling structure according to claim 7, wherein a flow-regulating member for suppressing contact of cooling air with the battery modules in the foremost vertical row is provided in the cooling air inlet of the battery case.

18. The battery cooling structure according to claim 8, wherein a flow-regulating member for suppressing contact of cooling air with the battery modules in the foremost vertical row is provided in the cooling air inlet of the battery case.

19. The battery cooling structure according to claim 10, wherein a flow-regulating member for suppressing contact of cooling air with the battery modules.

20. A battery cooling structure, in which a large number of rod-shaped battery modules, cooled with cooling air, are disposed parallel to one another, said battery cooling structure comprising:
- a battery case formed in a rectangular shape, having a cooling air inlet and a cooling air outlet opposed to one another, said battery case including,
  - (a) a pair of opposing first plates, said pair of first plates supporting opposite ends of said battery modules, and
  - (b) a pair of opposing second plates, said first plates and said second plates cooperatively forming an inner surface of said rectangularly shaped battery case,
- wherein an inner surface of at least one of said pair of second plates includes a cooling air guide channel having a recess formed into said inner surface,
- wherein a bottom of said recess has a stepped portion at a location between said cooling air inlet and said cooling air outlet,
- wherein a depth of said recess changes step-by-step in a direction of flow of cooling air so that an opening area of the cooling air outlet is smaller than that of the cooling air inlet.

* * * * *